United States Patent
Elalouf

(10) Patent No.: US 9,479,797 B2
(45) Date of Patent: Oct. 25, 2016

(54) DEVICE AND METHOD FOR MULTIMEDIA DATA TRANSMISSION

(71) Applicant: Daniel Elalouf, Paris (FR)

(72) Inventor: Daniel Elalouf, Paris (FR)

(73) Assignee: COURTBAY INVESTMENTS LIMITED, Tortola (VG)

( * ) Notice: Subject to any disclaimer, the term of this patent is extended or adjusted under 35 U.S.C. 154(b) by 0 days.

(21) Appl. No.: 14/731,659

(22) Filed: Jun. 5, 2015

(65) Prior Publication Data

US 2015/0358642 A1 Dec. 10, 2015

(30) Foreign Application Priority Data

Jun. 6, 2014 (FR) ...................................... 14 55158

(51) Int. Cl.
*G06K 9/36* (2006.01)
*H04N 19/593* (2014.01)
(Continued)

(52) U.S. Cl.
CPC .......... *H04N 19/593* (2014.11); *H04N 19/115* (2014.11); *H04N 19/124* (2014.11); *H04N 19/137* (2014.11); *H04N 19/146* (2014.11); *H04N 19/164* (2014.11); *H04N 19/167* (2014.11); *H04N 19/172* (2014.11); *H04N 19/176* (2014.11); *H04N 19/40* (2014.11); *H04N 19/46* (2014.11); *H04N 19/52* (2014.11);
(Continued)

(58) Field of Classification Search
CPC .. H04N 19/94; H04N 19/137; H04N 19/146; H04N 19/167; H04N 19/176; H04N 19/20; H04N 19/40; H04N 19/52; H04N 19/523; H04N 19/593; H04N 19/61; H04N 19/91
USPC .................................. 382/232–233, 250–251
See application file for complete search history.

(56) References Cited

U.S. PATENT DOCUMENTS 9,049,271 B1* 6/2015 Hobbs ..................... H04L 47/25
2004/0095997 A1* 5/2004 Altunbasak .......... H04N 19/176
375/240.13

(Continued)

FOREIGN PATENT DOCUMENTS

EP 1575300 A1 9/2005
WO 2011081639 A2 7/2011

OTHER PUBLICATIONS

French Search Report, dated Feb. 2, 2015, from corresponding French application.

(Continued)

*Primary Examiner* — Kanjibhai Patel
(74) *Attorney, Agent, or Firm* — Young & Thompson

(57) ABSTRACT

A method to transmit images of a video sequence over a transmission channel between a transmitter and a receiver of a communication network, the image being composed of several image areas, the method for an image to be transmitted including: identifying image areas of a first type in the image; identifying image areas of a second type in the image; determining a transmission rate for transmission of the image to the receiver as a function of the number of first-type image areas compared with the number of second-type image areas; selecting a coding scheme for each image area as a function of area type; modifying the coding parameters as a function of the determined transmission rate; encoding the image areas by applying the selected coding scheme and the modified coding parameters; and transmitting the image areas at the determined transmission rate. Improved image quality is thus obtained.

20 Claims, 6 Drawing Sheets

(51) Int. Cl.
*H04N 19/52* (2014.01)
*H04N 19/91* (2014.01)
*H04N 19/94* (2014.01)
*H04N 19/40* (2014.01)
*H04N 19/523* (2014.01)
*H04N 19/176* (2014.01)
*H04N 19/172* (2014.01)
*H04N 19/46* (2014.01)
*H04N 19/115* (2014.01)
*H04N 19/124* (2014.01)
*H04N 19/137* (2014.01)
*H04N 19/146* (2014.01)
*H04N 19/164* (2014.01)
*H04N 19/167* (2014.01)
*H04N 19/61* (2014.01)
*H04N 19/20* (2014.01)

(52) U.S. Cl.
CPC ............ *H04N19/523* (2014.11); *H04N 19/91* (2014.11); *H04N 19/94* (2014.11); *H04N 19/20* (2014.11); *H04N 19/61* (2014.11)

(56) References Cited

U.S. PATENT DOCUMENTS

| | | |
|---|---|---|
| 2006/0095943 A1 | 5/2006 | Demircin et al. |
| 2006/0204113 A1 | 9/2006 | Wang et al. |
| 2010/0124274 A1 | 5/2010 | Cheok et al. |
| 2013/0156095 A1* | 6/2013 | Li .................... H04N 21/233 375/240.02 |
| 2014/0016693 A1* | 1/2014 | Zhang ............... H04N 21/2343 375/240.02 |

OTHER PUBLICATIONS

Van Beek P. et al: "Adaptive streaming of high-quality video over wireless LANs", Proceedings of SPIE, S P I E—International Society for Optical Engineering, US, vol. 5308, No. 1, Jan. 10, 2004 (Jan. 10, 2004), pp. 647-660, XP882312522.

* cited by examiner

DEVICE AND METHOD FOR MULTIMEDIA DATA TRANSMISSION

TECHNICAL FIELD OF THE INVENTION

The invention is directed to the field of telecommunications. It concerns a data communication method over a communication path e.g. a wireless path and more particularly a video data communication method. It also relates to a transmission device, to a wireless communication device, a server and computer programme.

STATE OF THE ART

Unremitting growth is observed in the amount of data to be transmitted via telecommunications systems, in particular for multimedia applications. This large amount of data requires the availability of broad bandwidths in the devices allowing the transmission of this data and a memory of large capacity for the storing thereof at the different steps of the processing, transmission and exploitation processes.

To reduce both the bandwidths and storage capacities without reducing too extensively the possible exploitation of such data, various methods and devices have been developed over the years.

For example, if a video sequence is to be transmitted and/or stored, many of these methods and devices used statistical redundancy both in the time domain and in the spatial domain composing the said video sequence. To allow compatibility between items of equipment designed and manufactured by different companies, standardisation bodies such as ITU, ISO, SMPTE have validated some video compression algorithms. As indicated, these algorithms use space and time redundancies of data representing images so to generate binary streams of data of reduced size compared with the set of initial data representing these video sequences. In general, for a compression method, an image to be processed is partitioned into blocks of pixels (e.g. 4×4, 4×8, 8×4, 8×8, 8×16, 16×8 of 4×4 or 8×8 depending on the standard). When processing data representing images of a video sequence, transformation into the frequency domain followed by quantization allows the approximation or removal of high frequency components thus generated without significantly degrading the visual impression by taking advantage of the fact that the eye is less sensitive to these high frequency signals. The data can then be quantized via entropy coding.

Conventional techniques for video compression can generally be divided into two categories. In the first, use is made of spatial redundancy to compress an image. Each block of data representing an image currently being processing is spatially predicted by an "Intra" predictor of the same image. In the second category, use is made of temporal redundancy. With this technique it is possible to predict an image from one or more other reference images previously decoded within the same sequence (motion prediction). This technique entails searching within these reference images the block which best corresponds to the block to be predicted, and only a motion estimation vector is retained corresponding to the movement of the block between two images together with a residual error allowing the fine-tuning of visual quality. Each block of an image currently being processing is temporally predicted by an "Inter" predictor.

With these compression techniques it is possible to reduce the transmission rate and hence the bandwidth required for transmission of a video stream through a telecommunication network for example. In existing video encoding systems, a compression rate must be selected that is adapted to the application and hence to the service under consideration. The more the video stream is compressed, and hence the more the transmission rate is reduced, the more the quality of the video as perceived by the user of the service may be deteriorated. It is therefore important to find a good compromise between a transmission rate compatible with the bandwidth of the transmission system, the images of the video sequence and an efficient encoding method to prevent extensive deterioration of the perceived image.

OBJECT OF THE INVENTION

The present invention sets out to improve the compression of a video sequence and adaptation to transmission rate.

A first aspect of the invention concerns a method for transmitting images of a video sequence over a transmission channel between a transmitter and a receiver of a wireless communication network, the image being composed of several image areas, the method for an image to be transmitted comprising: identification of image areas of a first type in the image; identification of image areas of a second type in the image; determination of a transmission rate for transmission of the image to the receiver as a function of the number of image areas of the first type compared with the number of image areas of the second type; selection of a coding scheme for each image area as a function of area type; modification of coding parameters as a function of the determined transmission rate; encoding of image areas by applying the selected coding scheme and modified coding parameters, and transmission of the image areas at the determined transmission rate.

According to one embodiment of the invention, an image area of the first type is composed of image blocks comprising at least one moving object in the video sequence.

According to one embodiment of the invention, an image area of the second type is composed of image blocks comprising at least one stationary object in the video sequence.

According to one embodiment of the invention, the images are compressed as per a compression standard selected from among the following standards: MPEG-1, MPEG-2/H.262, MPEG-4, H.261, H.263 and H.264.

According to one embodiment of the invention, the areas are classified as a function of the luminosity of the blocks in the area.

According to one embodiment of the invention, the modification of the coding parameters (S104) comprises the modification of the quantization applied for compression of the image blocks as a function of the types of identified areas.

According to one embodiment of the invention, the quantization pitch is modified as a function of the types of identified areas.

According to one embodiment of the invention, the modification of the coding parameters comprises a step to modify the number of coefficients derived from transformation for each image block as a function of the types of identified areas.

According to one embodiment, the transmission rate is determined as a function of the location of the receiver.

According to one embodiment, the transmission rate is determined as a function of the network to which the receiver is connected.

According to one embodiment, the transmission rate is determined as a function of the application used in the receiver which exploits the video data.

According to one embodiment, the transmission rate is determined as a function of the size of the screen displaying the data received by the receiver.

A second aspect of the invention concerns a device for encoding an image to be transmitted by a transmitter to a receiver, this device comprising:
 a processor adapted to:
  identify image areas of a first type in the image and image areas of a second type in the image;
  determine a transmission rate for transmission of the image to the receiver as a function of the number of first-type image areas compared with the number of second-type image areas;
  select a coding scheme for each image area as a function of area type;
  adapt coding parameters as a function of the determined transmission rate;
 a coder to encode image areas by applying the selected coding scheme and adapted coding parameters; and
 a communication module adapted to transmit over a telecommunications network at least one compressed video stream according to one embodiment conforming to the first aspect of the invention and data representing the adapted coding parameters.

A third aspect of the invention concerns a device for decoding a binary stream corresponding to a video sequence, comprising:
 a communication module to receive data representing a video signal and adapted coding parameters transmitted by the method according to an embodiment conforming to the first aspect of the invention;
 a processor implementing a method to process adapted coding parameters received in the binary stream to obtain decoding parameters; and
 a decoder module to decode data representing a video signal and received as a function of the decoding parameters.

A fourth aspect of the invention concerns a mobile communication device comprising the decoder device according to the third aspect of the invention.

A fifth aspect of the invention concerns a method to decode a binary stream corresponding to data representing a video sequence comprising:
 the receiving of video data and adapted coding parameters, transmitted by the method according to one embodiment conforming to the first aspect of the invention;
 the processing of adapted coding parameters received in the binary stream, to obtain decoding parameters; and
 the decoding of the video data received as a function of the decoding parameters.

Some embodiments of the invention allow the adjusting of the transmission rate as a function of the pertinence of the data carried in each area of the images of a sequence of images. If it is considered for example that the most pertinent portion of the images concerns moving objects, a high transmission rate can be allocated to this portion and a slower rate can be allocated to a portion of image concerning stationary objects. In addition, by adapting the coding to the type of image area, more efficient coding can be obtained.

The invention also concerns means for storing data that are fully or partly removable, legible by a computer system, comprising instructions for a computer programme adapted to implement an encoding or decoding method conforming to the invention when this programme is loaded onto and run by the computer system. The invention also concerns a computer programme legible by a microprocessor comprising portions of software code adapted to carry out an encoding or decoding method conforming to the invention when it is loaded onto and run by the microprocessor.

The data storage means and computer programme have similar characteristics and advantages to the methods they carry out.

BRIEF DESCRIPTION OF FIGURES

Other particular aspects and advantages of the invention will become further apparent from the description below illustrated by the appended drawings in which.

DESCRIPTION OF EXEMPLARY EMBODIMENTS OF THE INVENTION

The method according embodiments of the invention, as detailed below, processes a video sequence image-by-image. A digital image is represented by one or more matrices the coefficients of which represent pixels.

In general, for the coding of an image the image is partitioned. For example according to standard H.264/AVC the images are divided into slices. A slice is a portion of the image or the whole image. These slices are divided into macroblocks, generally blocks of size 16 pixels×16 pixels, and each macroblock can in turn be divided into different sizes of data blocks 102, for example 4×4, 4×8, 8×4, 8×8, 8×16, 16×8. A macroblock is a coding unit in standard H.264. The term macroblock generally designates an image portion and corresponds to a matrix of dimension two, itself formed of image blocks.

Figure 1:
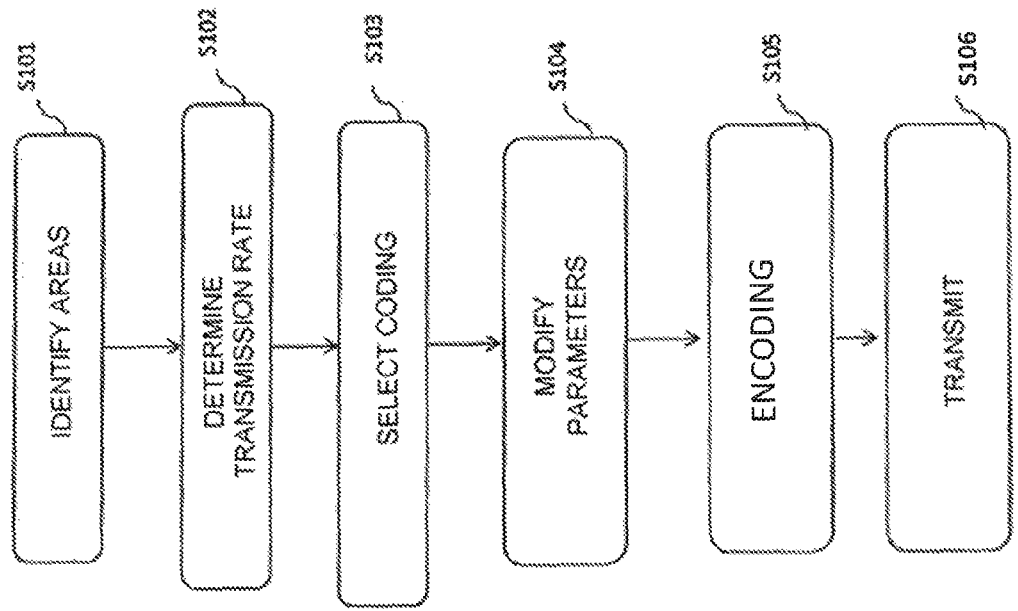
FIG. 1 illustrates steps of a method to transmit data representing a video sequence according to a first embodiment of the invention.

One method for transmitting a sequence of images according to a first embodiment of the invention is illustrated in FIG. 1. An input video sequence is processed image-by-image in several steps. At a first step S101 image pre-processing is carried out the objective of which is to analyse the content of the image so as to identify areas of different types. Two types of area can be defined for example; a first type of area for areas containing at least one moving object, and a second type of area for image areas only containing stationary objects. In other embodiments of the invention, the types of area can be defined as a function of their luminosity.

Image analysis in the first embodiment of the invention applies a tracking algorithm to create a sequence of masks allowing the identification of the different types of area in the images of the sequence. For an area of a current image analysis comprises the identification, from images preceding the current image, of an object in the area under consideration in the current image. The identification of objects can be obtained for example by matching using Munkres algorithm, followed by a Kalman filter using the journaling of the positions of the objects in a defined number of images preceding the current image.

At a second step S102 a transmission rate of the image is determined as a function of the types of identified areas. A transmission rate is effectively determined as a function of the ratio between the number of first-type areas and the number of second-type areas in the same image. A transmission rate range is defined between a minimum transmission rate and maximum transmission rate. The transmission rate increases if the number of first-type areas increases relative to the number of second-type areas. In one particular embodiment, the transmission rate can be determined as a function of the number of blocks belonging to the first type of area in an image compared with the number of blocks belonging to the second type of area.

At a third step S103 a coding scheme is selected for each image area as a function of the type of identified area. Another factor that can be taken into account for the choice of coding is minimisation of a distortion measurement.

At a fourth step S104 some coding parameters are modified as a function of the determined transmission rate. For example the coefficients for a transformation step can be modified and/or the quantization pitches for a quantization step can be modified and/or a quantization offset can be adapted.

According to one particular embodiment, a value of the quantization pitch is selected that is to be applied during compression of the current image taking into consideration the identified image areas and the determined transmission rate. These quantization pitches are applied for example to the coefficients derived from Discrete Cosine Transform (DCT) to convert the image in the frequency domain. Other transforms can be used depending on the video compression standard under consideration. The value of the quantization pitch for the image areas comprising stationary objects will be higher than for the image areas comprising moving objects.

In another embodiment, the sizes of the image blocks to be encoded may be modified as a function of the determined transmission rate. For example, the size of the blocks in the second type of area could be increased to allow more efficient encoding and transmission.

At step S105 the data are encoded in accordance with the selected coding scheme and transmitted at the determined transmission rate at step S106.

Figure 2:
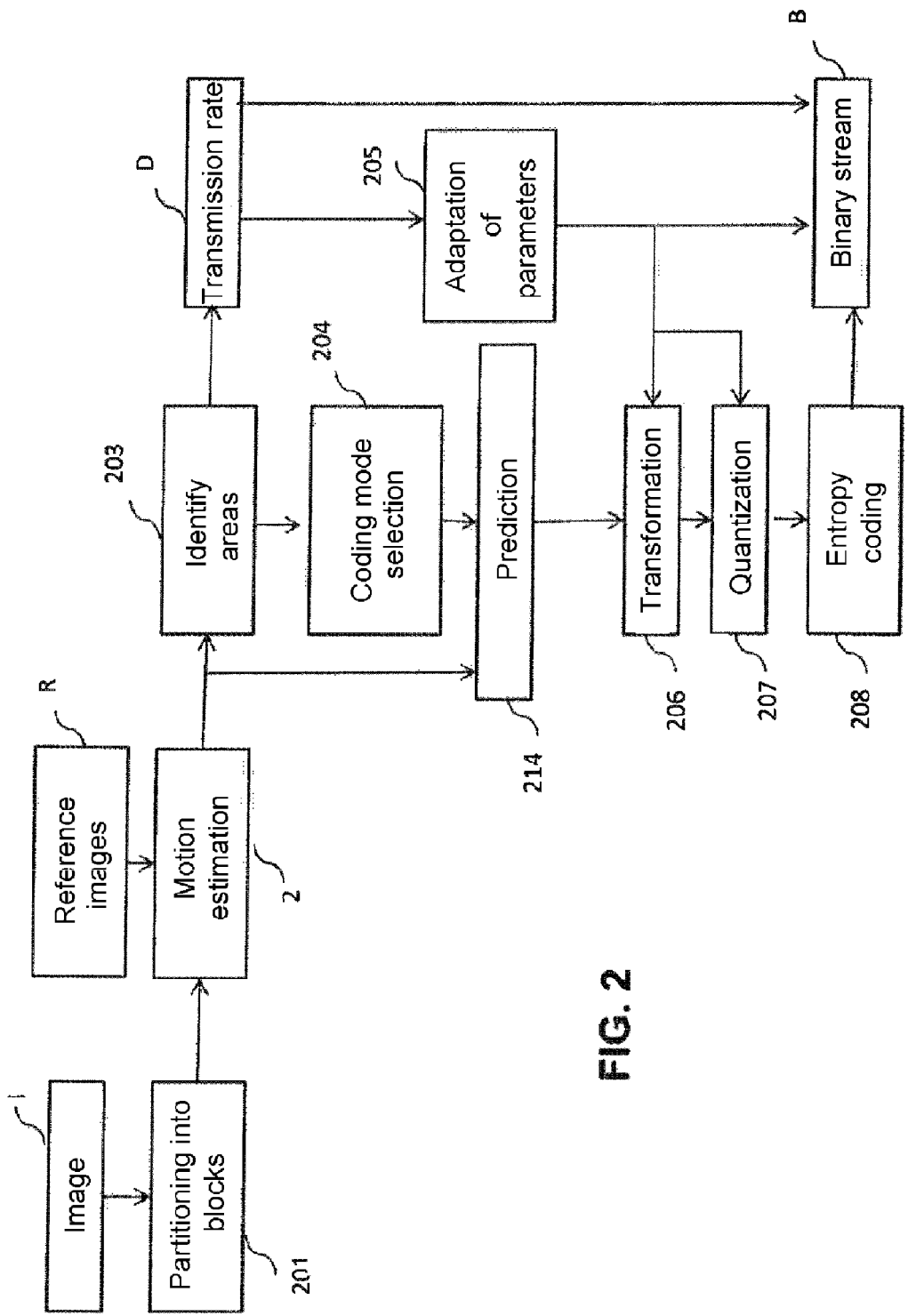
FIG. 2 gives a schematic of a video encoder according to one embodiment of the invention.

FIG. 2 gives a schematic of a video encoder 10 of H.264/AVC type for one embodiment of the invention.

An image I to be processed is partitioned into macroblocks by a partitioning module 201, for example into blocks of size 16 pixels×16 pixels. During video compression, each block of data representing a video sequence image being processed can be spatially predicted by an "Intra" predictor, or temporally by an "Inter" predictor. Each predictor is a block of pixels derived from the same image or from another image and a block of differences (or "residual") is deduced therefrom.

An estimation of motion by an estimation module 202 allows an area identification module 203 to identify the different types of areas in the image. This information allows a coding mode selection module 204 to determine the coding scheme to be applied to the identified image areas.

Regarding "Inter" coding, an estimation of motion between the current block and reference pictures R is performed to identify in one of these reference pictures a block of pixels that can be used as predictor for this current block. The reference images R used are formed of images of the video sequence which have already been encoded and then reconstructed (by decoding). This estimation of motion can apply a matching algorithm called a "Block Matching Algorithm" (BMA).

For "Intra" prediction of an image area having pixels representing a stationary object, the current block is predicted using an "Intra" predictor using data of the current image that are already encoded. The predictor block identified by this algorithm is then subtracted from the current block of the image area to be processed so as to obtain a block of differences (block residual). This step is called "motion compensation" in conventional compression algorithms. These two types of coding therefore provide several texture residuals (difference between the current block and the predictor block) which are compared in a selection module which selects the best coding mode depending on the type of image area to determine which one thereof optimises a transmission rate/distortion criterion. If "Intra" coding is selected for a second type of area, data allowing description of the "Intra" predictor used is encoded before being inserted in the binary stream B. A prediction module 214 implements Inter or Intra prediction methods.

If the coding mode selection module 204 selects "Inter" coding for a first type of image area, data on motion is encoded and inserted in the binary stream B. This motion data is composed of a motion vector (indicating the position of the predictor block in the reference image relative to the position of the block to be predicted by the prediction module 214) and of an image index among the reference images. The residual selected by the selection module is then converted by a conversion module 206 in the frequency domain using a Discrete Cosine Transform (DCT), then quantized by a transform module 207. The parameters to be applied during the conversion performed by the conversion module 206 and during quantization performed by the quantization module 207 are adapted by the adaptation module as a function of the determined transmission rate. The quantization pitch values are modified by the modification module 205 and applied to this quantization. The coefficients of the quantized, transformed residual are then encoded using entropy or arithmetic coding 208 and inserted in the compressed binary stream B. Data representing the parameters thus adapted are inserted in the compressed binary stream for transmission to a decoder.

It is possible for example to reduce the transmission rate e.g. by increasing the value of the quantization pitch and hence to reduce the number of bits required for the representation thereof. One way to proceed for example is to represent the first coefficients on 4 bits instead of 8 bits and the last on 2 bits instead of 8 bits. The last coefficients represent the high frequency components of the block. Since the human eye is less sensitive thereto, the increase in the quantization pitch could be made in priority on these coefficients. For example, when there are 64 coefficients, the 32 first are represented on 4 bits instead of 8 and the following 32 on 2 bits instead of 8. If there are 32 coefficients, the 16 first could be represented on 4 bits instead of 8 and the following 16 on 2 bits instead of 8.

In another embodiment of the invention for example, for an image in an MPEG-4 video stream, a block of the image is composed of low and high frequency DCT coefficients (coefficients derived from the discrete cosine transform of the image, or from residues of the image). It is possible to remove the high frequency DCT coefficients and thereby to reduce the size of the stream of bits to be transmitted. For this variant of the method, the average number of bits to be removed is calculated in relation to the determined transmission rate for the image as a function of the identified areas and corresponds to a number of coefficients to be deleted. The number of coefficients to be deleted is higher for the image areas of second type comprising stationary objects than for the image areas of first type comprising moving objects. It is also possible to preserve maximum quality for the image areas having moving objects.

In this case, no coefficient is deleted for the blocks. On the other hand, with regard to the image areas of second type all the coefficients can be deleted. The blocks can then be encoded using a mode such as the Skip mode of standard MPEG-4, which means that the data from second-type areas are entirely removed and the latter will therefore remain the same as for preceding images. Regarding MPEG4 standard Part 2, the first coefficient of each block after sequencing is the coefficient of lowest frequency (DC coefficient) and the last coefficient is the coefficient of highest frequency. The frequencies are therefore progressively encoded.

Figure 3:
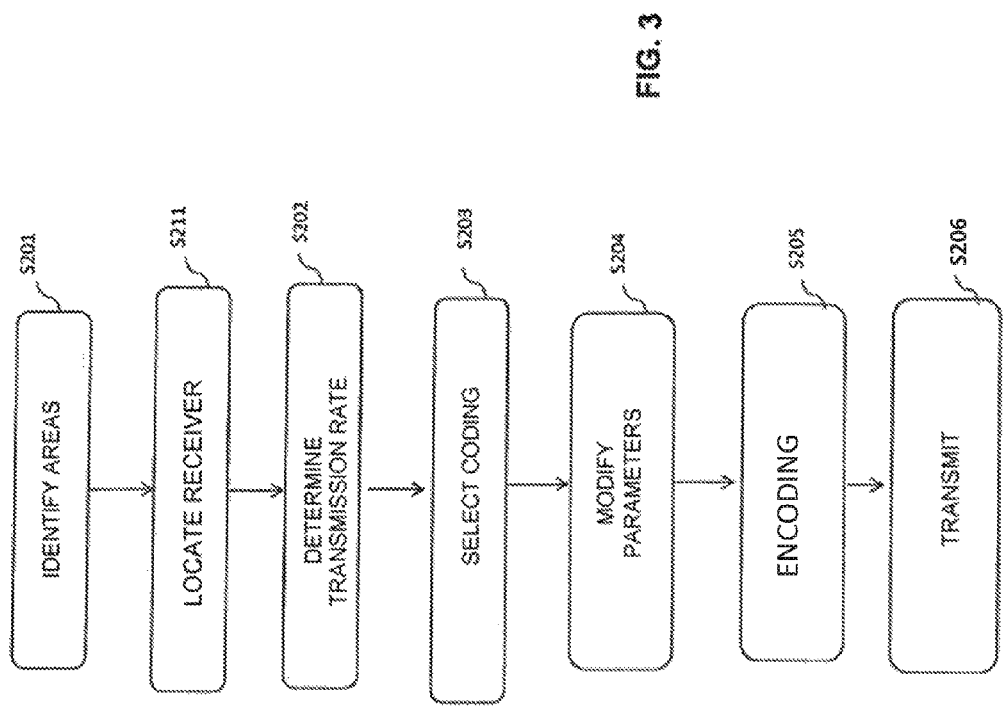
FIG. 3 illustrates steps of a method to transmit data representing a video sequence according to a second embodiment of the invention.

One method to transmit a sequence of images according to a second embodiment of the invention is illustrated in FIG. 3. An input video sequence is processed image-by-image in several steps, as for the first embodiment of the invention. The processing method of the second embodiment comprises an additional step compared to the method according to the first embodiment of the invention: this step S211 comprises the locating of the receiver that is to receive the data to be transmitted. The locating of the receiver can be obtained for example by analysing data sent by the receiver e.g. in a request sent by the receiver to receive the content to be encoded, or via geographical locating data e.g. by accessing GPS data relating to the receiver.

At step S202 a transmission rate of the image is determined as a function of the types of identified areas as for the first embodiment of the invention and as a function of the location of the receiver. The transmission rate can be reduced as a function of the distance between the receiver and the transmission device which performs the encoding and transmission of the data. The greater the distance between the receiver and the transmitter the slower the transmission rate.

At step S203 a coding scheme is selected for each image area as a function of the identified area type. Another factor which can be taken into account for the choice of coding is the location of the receiver so as to reduce or increase the amount of data to be sent to the receiver.

At a fourth step S204 some coding parameters for the selected coding scheme are modified as a function of the transmission rate determined for the location of the receiver. For example, the coefficients for a transformation step can be modified and/or the quantization pitches for a quantization step can be modified and/or a quantization offset can be adapted.

At step S205, the data are encoded following the selected coding scheme and transmitted at the determined transmission rate at step S206.

Therefore the amount of data to be transmitted can be adapted as a function of the location of the receiver. This aspect has advantages in particular when the receiver is in "roaming" mode on a foreign telecommunications network for example. This makes it possible to reduce the cost of data transmission.

Figure 4:
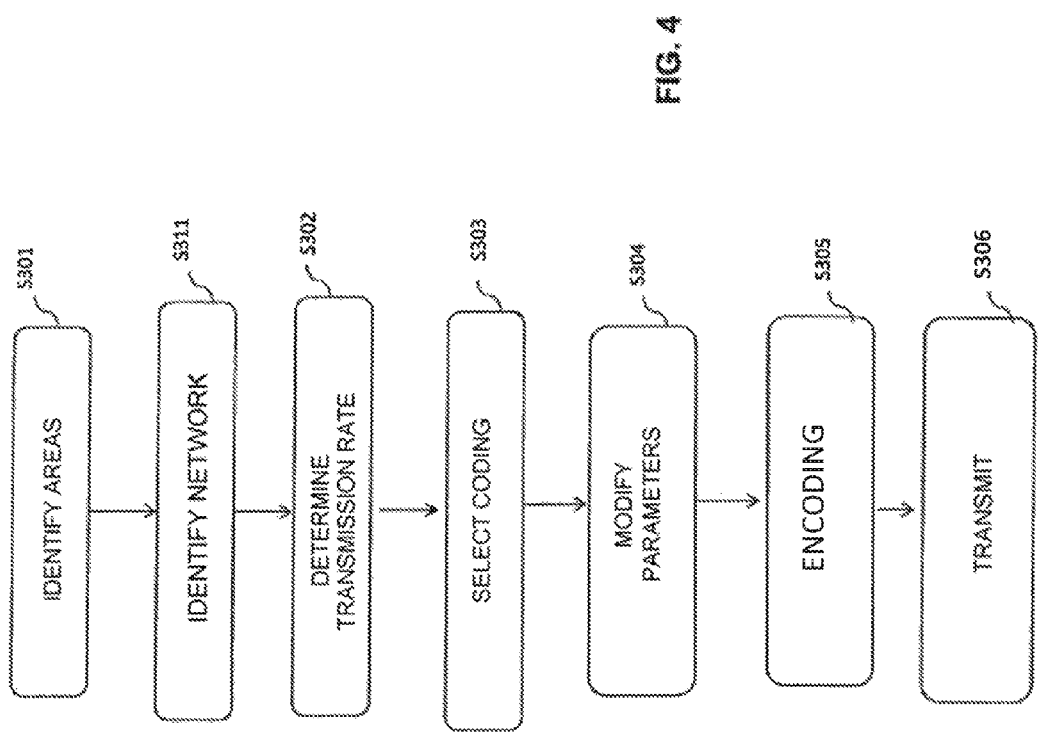
FIG. 4 illustrates steps of a method to transmit data representing a video sequence according to a third embodiment of the invention.

One method to transmit a sequence of images according to a third embodiment of the invention is illustrated in FIG. 4. An input video sequence is processed image-by-image in several steps, as for the first embodiment of the invention. The processing method according to the third embodiment comprises an additional step compared with the method according to the second embodiment of the invention: this step S311 comprises the identification of the network to which the receiver requesting data transmission is connected. The locating of the receiver can be obtained for example by analysing data sent by the receiver e.g. in a request sent by the receiver to receive the content to be encoded, or via geographical locating data e.g. by accessing network data concerning the receiver.

At step S302 a transmission rate of the image is determined as a function of the identified image area types as for the first embodiment of the invention and as a function of the network to which the receiver is connected. The transmission rate can be increased in relation to the bandwidth of the network or the performance capabilities of the network for example. The better the performance of the network the faster the transmission rate.

At step S303 a coding scheme is selected for each image area as a function of identified area type. Another factor which can be taken into account for the choice of coding is the network to which the receiver is connected so as to reduce or increase the amount of data to be sent to the receiver.

At a fourth step S304, some coding parameters for the selected coding scheme are modified as a function of the transmission rate determined for the receiver's network. For example the coefficients for a transformation step can be modified and/or the quantization pitches for a quantization step can be modified and/or a quantization offset can be adapted.

At step S305 the data are encoded following the selected coding scheme and transmitted at step S306 at the determined transmission rate.

Therefore the transmission rate can be adapted as a function of the network to which the receiver is connected. This aspect has advantages in particular when the receiver is connected to a high-performance network of 4G type for example. This allows data to be received at a faster rate.

In another embodiment, the processing method comprises an additional step compared with the method according to the first embodiment of the invention, to identify the application used in the receiver which exploits the video data. The identification of the video data application can be obtained for example by analysing data sent by the receiver e.g. in a request sent by the receiver to receive the video content.

Therefore the amount of data to be transmitted can be adapted in relation to the application which exploits the data. An application which requires good image quality would receive a larger amount of data compared with an application displaying lesser image quality.

In another embodiment the processing method comprises an additional step compared with the method according to the first embodiment of the invention, to identify the size of the receiver's screen on which the video data are displayed. The identification of screen size for display of video data can be obtained for example by analysing data sent by the receiver in a request sent by the receiver to receive the video content.

Therefore the amount of data to be transmitted can be adapted to screen size and corresponding image quality. For example, a device with a small screen e.g. the screen of a smartphone, would receive a smaller amount of data than a device having the capability of displaying an image of better quality on a larger screen e.g. a tablet computer.

Figure 5:
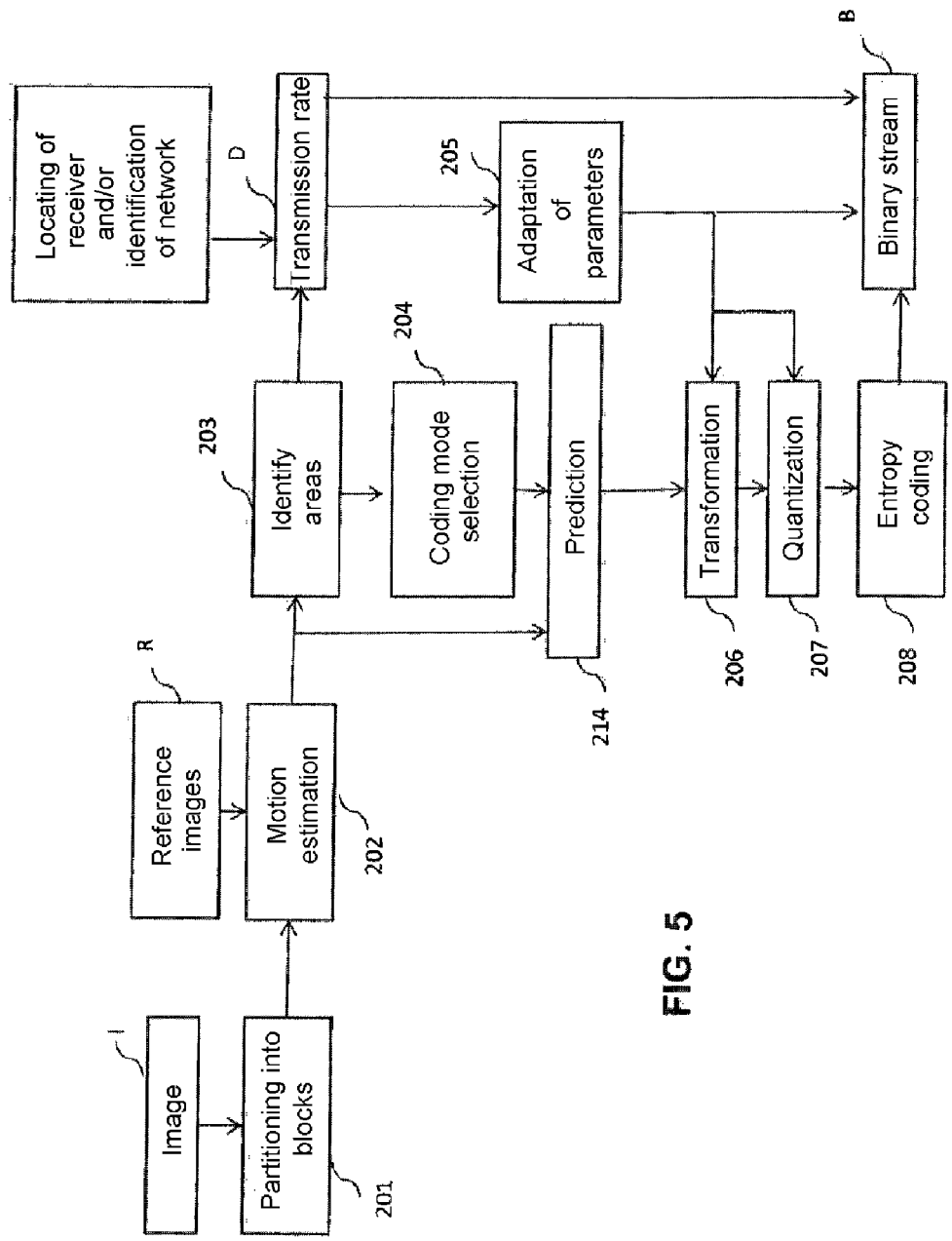
FIG. 5 gives a schematic of a video encoder for the second and/or third embodiment of the invention.

FIG. 5 illustrates a scheme of a video encoder 10 of H.264/AVC type for the second and/or third embodiment of the invention.

The encoder is similar to the encoder for the first embodiment of the invention. It further comprises a module for transmitting data representing the location of the receiver and/or data representing the network to which the receiver is connected, to the transmission rate determination module D.

Figure 6:
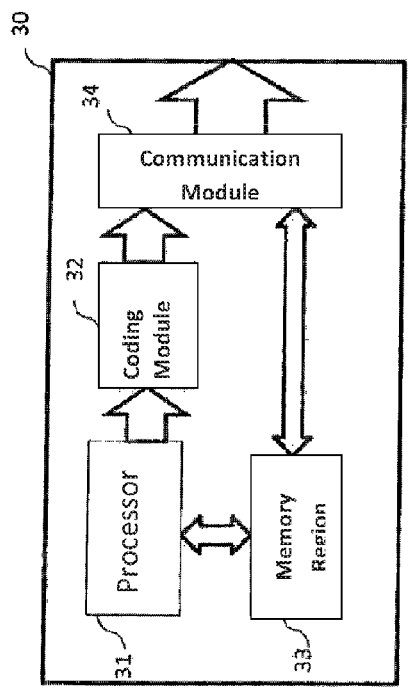
FIG. 6 gives a schematic of a device for encoding data representing a video sequence according to one embodiment of the invention.

The video stream transmission method according to the described embodiments can be used in a video encoding device. A video encoding device according to one embodiment of the invention is illustrated in FIG. 6. It comprises at least one processor 31 implementing a transmission rate adaptation method according to embodiments of the invention, a coding module 32 to encode video data as a function of adapted coding parameters, a memory region 33 and a communication module 34 enabling the video system to transmit the compressed video stream over a telecommunications network together with additional coding and transmission rate data resulting from the implementation of the method.

Figure 7:
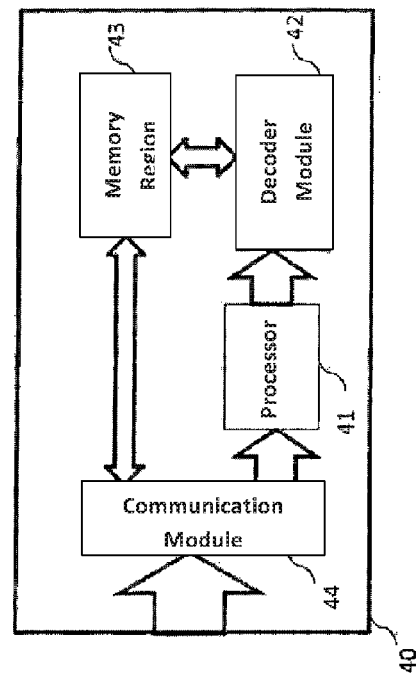
FIG. 7 gives a schematic of a device for decoding data representing a video sequence according to one embodiment of the invention.

A video decoder device according to one embodiment of the invention is illustrated in FIG. 7. It comprises at least one communication module 44 allowing the receiving of data representing compressed video sequences and adapted coding parameters, a processor 41 implementing a method to process adapted coding parameters received in the binary stream to obtain decoding parameters, a decoder module 42 to decode data representing a received video sequence as a function of the decoding parameters, a memory region 43. The decoder device can be integrated in a mobile communication device such as a smartphone for example, a tablet or laptop computer.

Some embodiments of the invention particularly have the advantage of maintaining better quality for parts of the video stream carrying the most important data such as parts comprising moving objects, whilst paying heed to a transmission rate constraint, this constraint possibly being related to the available bandwidth in a telecommunications network.

Some embodiments find application in smartphones, tablets, etc.

Evidently numerous modifications can be made to the examples of embodiment described in the foregoing without departing from the scope of the invention.

The invention claimed is:

1. A method to transmit images of a video sequence over a transmission channel between a transmitter and a receiver of a wireless communication network, each image being composed of a plurality of image areas, the method for an image to be transmitted, comprising:
    identifying (S101) image areas of a first type in the image to be transmitted;
    identifying (S101) image areas of a second type in the image to be transmitted;
    determining a location (S211) of the receiver that is to receive data of the image to be transmitted;
    determining (S102) a transmission rate for transmission of the image to the receiver as a function of the number of image areas of the first type identified in the image compared with the number of image areas of the second type identified in the image, and further as a function of the determined location of the receiver;
    selecting (S103) a coding scheme for each image area as a function of area type;
    modifying (S104) coding parameters of the coding scheme as a function of the determined transmission rate;
    encoding the image areas (S105) by applying the selected coding scheme and modified coding parameters; and
    transmitting (S106) the image areas at the determined transmission rate.

2. The method according to claim 1, wherein an image area of the first type is composed of image blocks comprising at least one moving object in the video sequence.

3. The method according to claim 2, wherein the images are compressed in accordance with a compression standard selected from the group consisting of: MPEG-1, MPEG-2/H.262, MPEG-4, H.261, H.263 and H.264.

4. The method according to claim 1, wherein an image area of the second type is composed of image blocks comprising at least one stationary object in the video sequence.

5. The method according to claim 4, wherein the images are compressed in accordance with a compression standard selected from the group consisting of: MPEG-1, MPEG-2/H.262, MPEG-4, H.261, H.263 and H.264.

6. The method according to claim 1, wherein the images are compressed in accordance with a compression standard selected from the group consisting of: MPEG-1, MPEG-2/H.262, MPEG-4, H.261, H.263, and H.264.

7. The method according to claim 1, wherein the image areas are classified as a function of a luminosity of the blocks of the area.

8. The method according to claim 1, wherein the modifying of the coding parameters (S104) comprises modification of the quantization applied for compression of the image blocks as a function of the types of identified areas.

9. The method according to claim 8, wherein the quantization pitch is modified as a function of the types of identified areas.

10. The method according to claim 1, wherein the modifying of the coding parameters comprises the modification of the number of coefficients derived from transformation for each image block as a function of the types of identified areas.

11. The method according to claim 1, wherein the transmission rate is determined as a function of the communication network to which the receiver is connected.

12. The method according to claim 1, wherein the transmission rate is determined as a function of an application used by the receiver for exploiting the video data.

13. The method according to claim 1, wherein the transmission rate is determined as a function of a size of a screen that displays the data received by the receiver.

14. The method according to claim 1, wherein a size of image blocks to be encoded is modified as a function of the determined transmission rate.

15. A device to decode a binary stream corresponding to a video sequence, comprising:
    a communication module (44) to receive data representing video sequences and adapted coding parameters transmitted using the method according to claim 1;
    a processor (41) implementing a method to process adapted coding parameters received in the binary stream to obtain decoding parameters; and a decoder module (42) to decode data representing received video sequences as a function of the decoding parameters.

16. A mobile communication device comprising the decoder device according to claim 15.

17. A method to decode a binary stream corresponding to a video sequence, comprising:
- receiving data representing the video sequence and adapted coding parameters transmitted by the method according to claim 1;
- processing adapted coding parameters received in the binary stream, to obtain decoding parameters; and
- decoding the received data representing the video sequence as a function of the decoding parameters.

18. Data storage means, legible by a computer system, comprising instructions for a computer programme adapted to implement the method according to claim 1 when the programme is loaded onto and run by the computer system.

19. A non-transitory computer-readable medium on which is stored a program that causes a microprocessor to implement the method according to claim 1 when the program is loaded onto and run by the microprocessor.

20. A device that encodes an image, comprising:
- a processor (31) adapted to:
  - identify image areas of a first type in the image and image areas of a second type in the image,
  - determine a location of a receiver to which data of the image is to be transmitted,
  - determine a transmission rate for transmission of the image to the receiver as a function of a number of identified first-type image areas compared with a number of identified second-type image areas, and further as a function of the determined location of the receiver,
  - select a coding scheme for each image area as a function of type of area, and
  - adapt coding parameters of the coding scheme as a function of the determined transmission rate;
- a coder (32) that encodes image areas by applying the selected coding scheme and the adapted coding parameters; and
- a communication module (34) that transmits, over a telecommunication network, at least a compressed video stream and data representing the adapted coding parameters.

* * * * *